May 21, 1957     R. J. BRITTAIN, JR     2,793,088
JOURNAL BOX
Filed Jan. 24, 1956
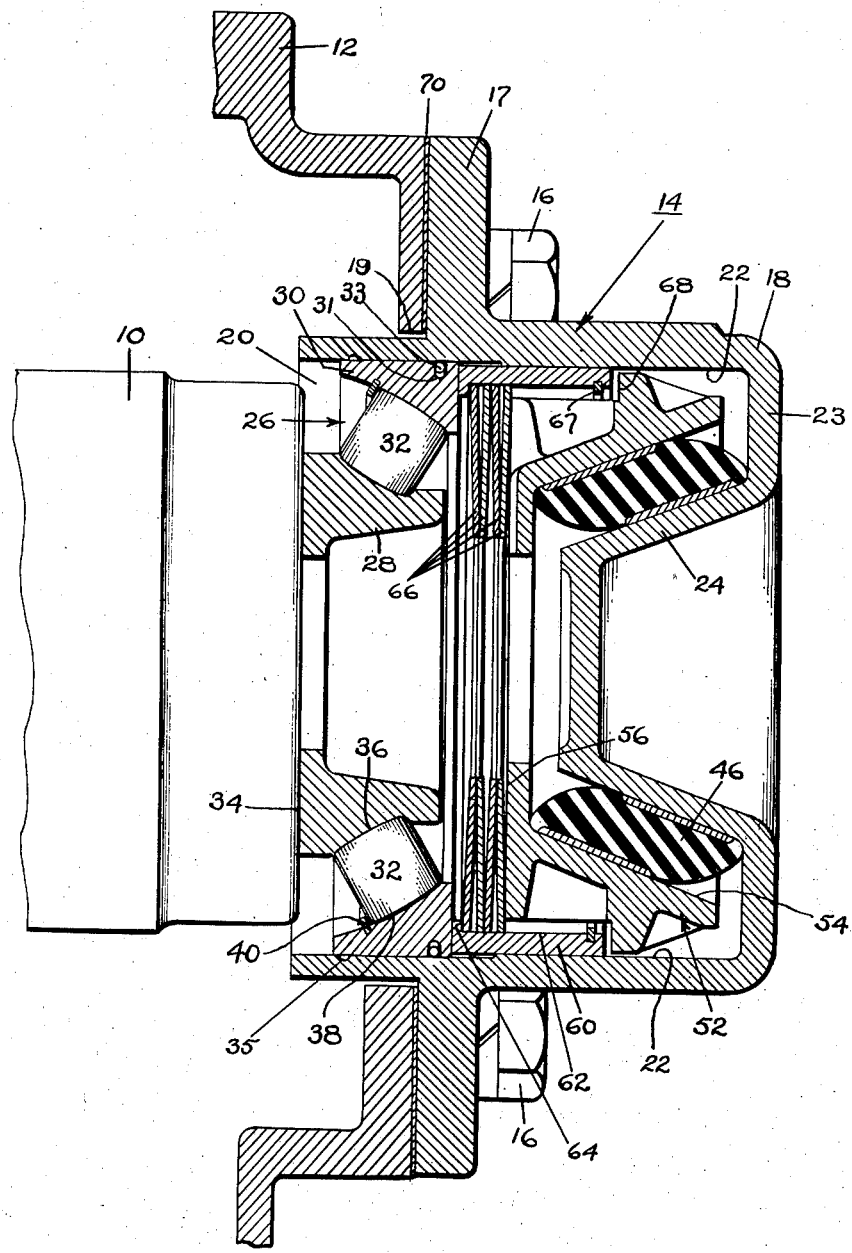
INVENTOR;
RICHARD J. BRITTAIN JR.
BY Edward H. Goodrich
HIS ATTORNEY.

United States Patent Office 2,793,088
Patented May 21, 1957

2,793,088

JOURNAL BOX

Richard J. Brittain, Jr., Berkeley Heights, N. J., assignor to General Motors Corporation, Detroit, Mich., a corporation of Delaware Application January 24, 1956, Serial No. 561,028

14 Claims. (Cl. 308—41)

This invention relates to a railway journal box and, more particularly, pertains to an assembly adapted to absorb the axial thrust load from an axle member in such a box.

In a thrust mechanism utilizing a thrust bearing comprised of races and roller elements in conjunction with a rotating and axially shifting axle, the axial shifting of the axle results in contact not being continuously maintained between the axle and thrust bearing. This interrupted contact results in intermittent rotation of the bearing elements with a consequent spalling of the raceways due to repeated striking of the axle against the thrust bearing while the rollers are not rolling against the raceways of the bearing. The interrupted axle-bearing contact also tends to cause axial looseness between the bearing components resulting in another severe bearing wear condition.

It is, therefore, a purpose of the present invention to provide means whereby a thrust bearing is axially biased into engagement with an axle to provide continuous roller rotation as well as to maintain contact between the bearing components.

In the subject journal box thrust assembly, it is proposed to combine a thrust bearing with a resilient thrust absorbing member of the type shown in Brittain U. S. Patent 2,676,854. This combination has resulted in a very effective thrust absorbing mechanism. It has been found that such a resilient thrust absorbing member should be maintained under a preload or compressive stress to insure satisfactory operation.

Accordingly, it is a further purpose of the invention to provide means for maintaining the resilient thrust member under a preload in the thrust assembly.

It is still another purpose of this invention to provide a thrust assembly comprising a thrust bearing member, a resilient thrust absorbing member, and common means for maintaining the thrust bearing components in contact with each other, as well as with the axle, and also for maintaining the resilient member in a preloaded condition.

These and other objects will be apparent from a perusal of the detailed description which follows:

The single figure of the drawing discloses a preferred form of the thrust absorbing assembly as mounted on a journal box.

In the drawing the axle 10 is shown disposed in a journal box 12. A thrust absorbing assembly 14 is removably secured by studs 16 to the journal box 12 through a flange 17 formed on an end cap 18 which extends through a bore 19 in the end of the journal box 12.

The thrust assembly includes the end cap 18 having a counterbore 20 and a bore 22 which is closed at its outer end 23. The closed end 23 is centrally recessed to form a frusto-conical inwardly extending projection 24.

A thrust bearing 26 is slidably mounted within the end cap 18 adjacent the end of the axle and includes an inner race ring 28, an outer race ring 30 and rolling elements as rollers 32 disposed therebetween. The inner race ring 28 has a flat end face 34 adapted to ride against the end of the axle 10. The inner and outer race rings are respectively provided with angularly disposed raceways 36 and 38 against which the rollers 32 engage. A snap ring 40, mounted within the outer race ring, locates the rollers in position and maintains the bearing 26 in unit-handling assembly. The inclination of the raceways 36 and 38 is such that the axes of the rollers 32 will converge with an outboard extension of the axis of axle 10 and within the end cap 18. The rollers 32 are preferably barrel-shaped and rollingly engage raceways that are parti-spherical to accommodate conditions of misalignment and assure uniform end contact of the inner race ring face 34 against the end of the axle 10. The outer race ring 30 slidably fits within the counterbore 20 so that the bearing 26 may move endwise in the end cap 18 under control of endwise movement of the axle 10. The outer race ring 30 has an annular groove 31 containing a resilient snap ring 33 which frictionally engages the wall of the counterbore 20 to restrict the outer race ring from rotating. This snap ring has sufficiently yieldable engagement with the wall of this counterbore so that the outer race ring is free to move axially. A shallow annular groove 35 in the inner open end of the end cap provides a temporary seat for the snap ring 33 to hold the parts in assembled relation with the end cap while the end cap is demounted from the journal box 12.

A resilient thrust member 46 is mounted on the frusto-conical projection 24 of the end cap 18. This resilient thrust member 46 constitutes no part of the present invention per se, and is described in detail in the U. S. Patent 2,676,854 to Brittain. It will suffice for the purposes of the present invention to say that the member 46 comprises a reinforced frusto-conical ring of synthetic rubber or other suitable yieldable material that is inherently and deformably resilient, and will not deteriorate in the presence of oil.

A thrust block 52 is mounted within the end cap 18 intermediate the thrust bearing 26 and the resilient cushion 46. The thrust block includes an internal frusto-conical surface 54 which generally corresponds to and is radially and axially spaced from the frusto-conical projection 24 of end cap 18. The conical surface 54 seats upon and is radially positioned by the resilient cushion member 46. The thrust block 52 has a flat end face 56 at the inner end of the frusto-conical portion 54.

A cylindrical sleeve 60 is slidably mounted within the bore 22 between the thrust bearing 26 and the thrust block 52. This sleeve has a cylindrical bore 62 terminating in a radially inwardly directed flange 64 which abuts against the outer race ring 30 of the thrust bearing. A stack of Belleville washers 66 or other appropriate spring means are slidably seated in the bore 62, the innermost washer engaging the flange 64. The other end of the Belleville washer stack yieldably abuts against the flat end face 56 of the thrust block 52. A snap ring 67 mounted in the sleeve 60 and normally out of engagement with the washers 66 holds the washers and sleeve 60 together as a unit for subassembly. The thrust block 52 has an annular flat face 68 which is normally spaced from the right-hand end of the sleeve 60 so that thrust from the bearing race ring 30 will be transmitted to the thrust block 52 through the resiliently yieldable Belleville washers 66. However, the spacing between the sleeve 60 and the thrust block 52 is such that the end of the sleeve 60 will abut the thrust block face 68 before the Belleville washers are collapsed to a flat condition.

As already suggested, it is necessary to maintain resilient thrust member 46 under a preload or compressive stress within the thrust assembly. It is common practice to preload such resilient members, as taught by Brittain 2,676,854, in order to maintain tight contact between the resilient member and its seat, in this case projection 24, and a movable thrust block, herein indicated as member 52. However, in most instances, the means by which such members are preloaded requires subsequent adjustment after the journal box has been in use for a prolonged period of time. By the use of the resilient Belleville stack 66, a continuing preloaded condition may be maintained with respect to the resilient member 46. A further and minute adjustment of the preload may be effected through shims 70 of desired thickness between the end cap flange 17 and the journal box body 12.

Thus, Belleville springs 66 exert equal and opposite thrust forces on the outer race ring 30 of bearing 26 and on thrust block 52. In this way the thrust bearing 26 will be more readily able to slidably follow the endwise movements of the axle 10 and thus maintain itself in the condition for continuous roller rotation, while concurrently maintaining cushion 46 under a preload thereby reducing the wear of the thrust components 26 and 46 and hence increasing the overall life of the thrust assembly 14.

The operation of the thrust assembly 14 is briefly as follows: upon movement of axle 10 towards the frusto-conical projection 24, thrust is transmitted through the inner race ring 28, rollers 32, outer race ring 30 and sleeve 60 all of which slide axially towards the right in end cap 18. Flange 64 engages the Belleville stack 66 compressing the latter and transmitting axle thrust to the block 52. Further axial thrust by axle 10 is resiliently resisted by the cushion 46 which progressively undergoes a shear deformation until it substantially fills the space defined by thrust block surfaces 54—56 and end cap surfaces 23—24. As already noted, upon the release of axle thrust, the springs 66 will provide the light axial thrust requisite to maintain cushion 46 under preload and bearing 26 in contact with axle 10 so that rotation of the axle always produces a rolling movement of the rollers 32 against the bearing raceways. The total extent of endwise movement of the axle 10 towards the end cap portion 24 is finally limited by the engagement of the sleeve 60 against the thrust block face 68 and by the engagement of the end of the thrust block 52 against the end cap wall 23. The sleeve 60 usually abuts the thrust block face 68 before the resilient cushion 46 has undergone much deformation.

I claim:

1. A journal box having an axle journalled for rotation and axial shifting therein, an end cap removably secured to the box, a thrust bearing intermediate said axle and end cap, a resilient cushion disposed within said end cap, a thrust block intermediate said bearing and said cushion, said thrust block being adapted to engage said cushion, and yieldable means axially biasing said thrust bearing and said thrust block, said means being adapted to maintain a preload on said thrust bearing.

2. A journal box as defined in claim 1 in which said thrust bearing, cushion, thrust block and biasing means are housed entirely within and axially movable with respect to said end cap.

3. A journal box as defined in claim 1 in which said means is disposed between said thrust bearing and said thrust block and biases the bearing and block in opposite directions.

4. A journal box having an axle journalled for rotation and axial shifting movement therein, an end cap demountably secured to the box, a thrust bearing between the axle and one end of said cap, a resilient cushion mounted within the end cap, a thrust block between the bearing and said cushion and engageable with the cushion, yieldable means axially biasing the thrust bearing and the thrust block and maintaining the bearing under preload, and mechanism demountably securing the bearing, cushion, thrust block and yieldable means in unit-handling assembled relation with said end cap.

5. A journal box having an axle journalled for rotation and endwise shifting movement therein, an end cap demountably secured to the box, a thrust bearing slidably mounted in the end cap between the axle and one end of the cap, a resilient cushion within the end cap, a thrust block between the bearing and the cushion and engageable with said cushion, a resilient member axially biasing the thrust bearing and the thrust block and slidable axially of the end cap, said member exerting a preload on the thrust bearing, and yieldable means between the thrust bearing and the end cap which demountably secures said thrust bearing, cushion, block and said member in unit-handling relation with the end cap.

6. A journal box having an axle journalled for rotation and axial shifting therein, an end cap removably secured to the box, an antifriction thrust bearing intermediate said axle and end cap, said thrust bearing including an outer race ring slidably supported within said end cap, a resilient cushion, a thrust block intermediate said thrust bearing and said cushion, and means coacting with said outer race ring to axially bias the thrust bearing toward said axle, said means also coacting with said thrust block to maintain the cushion under a compressive stress.

7. A journal box having an axle journalled for rotation and axial shifting therein, an end cap, a first resilient member, a second resilient member, a thrust block resiliently mounted between said members, said first member being adapted to absorb the axial thrust of the axle, and a thrust bearing intermediate the axle and the end cap, said second member axially biasing said bearing toward said axle.

8. A journal box having an axle journalled for rotation and axial shifting therein, an end cap removably secured to the box, a thrust bearing axially adjacent said axle, a thrust block, resilient means intermediate said bearing and said block, and a resilient cushion intermediate said thrust block and said end cap.

9. In a journal box having an axle journalled for rotation and axial shifting therein, an end cap removably secured to the box and having a circular recess, an end cap projection axially extending within the recess toward the axle, a thrust block, a compressed cushion fitted over the axially extended projection within said recess and peripherally seated against the thrust block, an antifriction thrust bearing having a rotatable inner race member engageable with the end of said axle, said thrust bearing and thrust block being axially slidable within the end cap, and spring means disposed intermediate said thrust block and the outer race of said bearing.

10. A journal box as described in claim 9 in which said thrust bearing includes inner and outer race rings adapted to rotatably support rollers therebetween, said race rings having inclined raceways the inclination of said raceways being such that the roller axes converge and intersect an outboard extension of the center line of said axle.

11. A journal box as defined in claim 9 in which said thrust bearing includes an outer race ring, a cylindrical sleeve slidably disposed in said end cap and axially engaging said outer race ring, said spring means being adapted to engage said sleeve and said thrust block to resiliently urge said thrust block in opposite axial directions.

12. A journal box as defined in claim 9 in which said thrust block and said end cap projection are frusto-conical in form, said thrust block including a flange portion formed at the narrow end thereof and adapted to provide a seating surface for said spring means.

13. A journal box as defined in claim 9 in which the thrust bearing includes an outer race ring, a cylindrical sleeve slidably mounted in the end cap, a flange on the sleeve engageable with the outer race ring, annular spring means slidably mounted in the sleeve and resiliently engaging the flange and the thrust block, and mechanism demountably securing said spring means in assembled relation with the sleeve.

14. A journal box having an axle journalled for rotation and axial shifting movement therein, an end cap demountably secured to the box, an antifriction thrust bearing between the axle and one end of said cap and including an outer race ring slidably mounted on the end cap, a resilient cushion mounted within the end cap, a thrust block mounted on the cushion, an axially resilient member slidably mounted in the end cap and axially biasing the thrust bearing outer race ring and said thrust block to maintain the thrust bearing under preload against the end of the axle, and a snap ring between the outer race ring and the end cap demountably holding the members within the end cap in unit-handling assembly with the end cap.

References Cited in the file of this patent

UNITED STATES PATENTS

| | | |
|---|---|---|
| 2,676,854 | Brittain | Apr. 27, 1954 |
| 2,697,015 | Noe | Dec. 14, 1954 |